United States Patent

Maliszewski

[11] Patent Number: 6,049,609
[45] Date of Patent: Apr. 11, 2000

[54] CELL ARRAY PROVIDING NON-PERSISTENT SECRET STORAGE THROUGH A MUTATION CYCLE

[75] Inventor: Richard L. Maliszewski, Forest Grove, Oreg.

[73] Assignee: Intel Corporation, Santa Clara, Calif.

[21] Appl. No.: 08/906,693

[22] Filed: Aug. 6, 1997

[51] Int. Cl.[7] .................................................. H04L 9/00
[52] U.S. Cl. .................................. 380/28; 380/4; 380/9; 380/49; 380/50; 395/186
[58] Field of Search ........................... 380/4, 9, 28, 49, 380/50, 59, 3, 21, 23, 24, 25, 29, 30, 36, 42, 43, 44; 395/186, 187.01, 188.01

[56] References Cited

U.S. PATENT DOCUMENTS

| | | | |
|---|---|---|---|
| 4,120,030 | 10/1978 | Johnstone | 380/4 |
| 4,278,837 | 7/1981 | Best | 380/4 |
| 4,306,289 | 12/1981 | Lumley | 380/4 |
| 4,319,079 | 3/1982 | Best | 380/4 |
| 4,465,901 | 8/1984 | Best | 380/4 |
| 4,786,790 | 11/1988 | Kruse et al. . | |
| 4,847,902 | 7/1989 | Hampson | 380/4 |
| 4,926,480 | 5/1990 | Chaum . | |
| 5,224,160 | 6/1993 | Paulini et al. . | |
| 5,265,164 | 11/1993 | Matyas . | |
| 5,347,579 | 9/1994 | Blandford . | |
| 5,469,507 | 11/1995 | Canetti et al. . | |
| 5,535,276 | 7/1996 | Ganesan . | |
| 5,696,822 | 12/1997 | Nachenberg | 380/4 |
| 5,892,899 | 4/1999 | Aucsmith et al. | 395/186 |

OTHER PUBLICATIONS

U.S. Patent Application No. 08/662,679 entitled "Tamper Resistant Methods and Apparatus" filed Jun. 13, 1996 by David Aucsmith and Gary Graunke.

Skardhamar, Rune, *Virus: Detection and Elimination,* Chapter 11: "Advanced Virus Programming", 1996, cover page, copyright page, & pp. 171–182.

*Primary Examiner*—Bernarr E. Gregory
*Attorney, Agent, or Firm*—Alan K. Aldous

[57] ABSTRACT

In one embodiment, the present invention includes a method of storing and retrieving data. The method includes performing mutations of a cell array in a mutation cycle until a storage phase is reached. The data is stored in storage regions of the cell array at the storage phase. The cell array is mutated through additional phases and the data stored in the cell array during the storage phase and is encrypted by the mutations through the additional phases. In response to a retrieval request, mutations continue until a retrieval phase is reached and the data is decrypted. In various embodiments, the invention includes a computer-readable medium, a binary structure, a system, and a method of creating a cell array.

24 Claims, 6 Drawing Sheets

| Beginning Phase | Pairings | Ending Phase | Cells in plain text at beginning phase | Cells in plain text at ending phase |
|---|---|---|---|---|
| Phase 0 (cell array 26 called in phase 0) | Cell 0 XOR Cell 4<br>Cell 1 XOR Cell 6<br>Cell 2 XOR Cell 7<br>Cell 3 XOR Cell 5 | Phase 1 | Cell 0 | Cell 5 |
| Phase 1 | Cell 0 XOR Cell 5<br>Cell 1 XOR Cell 6<br>Cell 2 XOR Cell 7<br>Cell 3 XOR Cell 4 | Phase 2 | Cell 5 | Cells 2 and 7 |
| Phase 2 | Cell 0 XOR Cell 7<br>Cell 1 XOR Cell 6<br>Cell 2 XOR Cell 5<br>Cell 3 XOR Cell 4 | Phase 3 | Cells 2 and 7 | Cell 6 |
| Phase 3 (secret data written to or read from cell 6 in phase 3) | Cell 0 XOR Cell 4<br>Cell 1 XOR Cell 5<br>Cell 2 XOR Cell 6<br>Cell 3 XOR Cell 7 | Phase 4 | Cell 6 | Cell 1 and 4 |
| Phase 4 | Cell 0 XOR Cell 6<br>Cell 1 XOR Cell 4<br>Cell 2 XOR Cell 7<br>Cell 3 XOR Cell 5 | Phase 5 | Cells 1 and 4 | Cell 2 |
| Phase 5 | Cell 0 XOR Cell 6<br>Cell 1 XOR Cell 4<br>Cell 2 XOR Cell 5<br>Cell 3 XOR Cell 7 | Phase 0 | Cell 2 | Cell 0 |

CELL ARRAY PROVIDING NON-PERSISTENT SECRET STORAGE THROUGH A MUTATION CYCLE

BACKGROUND OF THE INVENTION

1 Technical Field of the Invention

The present invention relates to storage of secret data and, more particularly, to a storage of secret data through use of a mutation cycle of a cell array.

2. Background Art

Most computer applications make no deliberate attempt to secure secrets during execution. Rather, they store secret values so as to be plainly readable in memory at all times, making them vulnerable to any process that can gain access to that memory. For example, an active program can search a hard disk looking for particular subject matter holding a secret. Once found, the secret or program holding the secret may be analyzed and/or destroyed. The secret and program may be removed or copied from the hard disk via a modem for remote analysis.

More sophisticated applications only have secrets plainly readable in memory, or "in the clear," at times when they are actually in use. The remainder of the time, they are kept in some encrypted form. This has the problem that another secret must be employed to decrypt the stored secrets. This protecting secret must then be protected for the values to be secure. Decrypting the various secrets can be time consuming. For example, the encrypted secrets may be stored on hard disks which require time to access.

U.S. patent application Ser. No. 08/662,679, filed Jun. 13, 1996, now U.S. Pat. No. 5,892,899, issued Apr. 6, 1999, entitled "Tamper Resistant Method and Apparatus", now U.S. Pat. No. 5,892,899, of Aucsmith et al. describes a tamper resistant procedure in which cells are exclusive-ORed with other cells to create mutations. The pattern of execution of this procedure may be the protecting secret. However, if bits are altered, the cells do not properly mutate.

Accordingly, there is a need for a method and apparatus to securely store secret data in such a way that the secret data may be rapidly stored and retrieved.

SUMMARY OF THE INVENTION

In one embodiment, the present invention includes a method of storing and retrieving data. The method includes performing mutations of a cell array in a mutation cycle until a storage phase is reached. The data is stored in storage regions of the cell array at the storage phase. The cell array is mutated through additional phases and the data stored in the cell array during the storage phase is encrypted by the mutations through the additional phases. In response to a retrieval request, mutations continue until a retrieval phase is reached and the data is decrypted.

In various embodiments, the invention includes a computer-readable medium, a binary structure, a system, and a method of creating a cell array.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 3 is a table showing the pairings and cells in plain text at different phases of a simplified mutation cycle of one embodiment of the present invention.

DETAILED DESCRIPTION OF PREFERRED EMBODIMENTS

Figure 1:
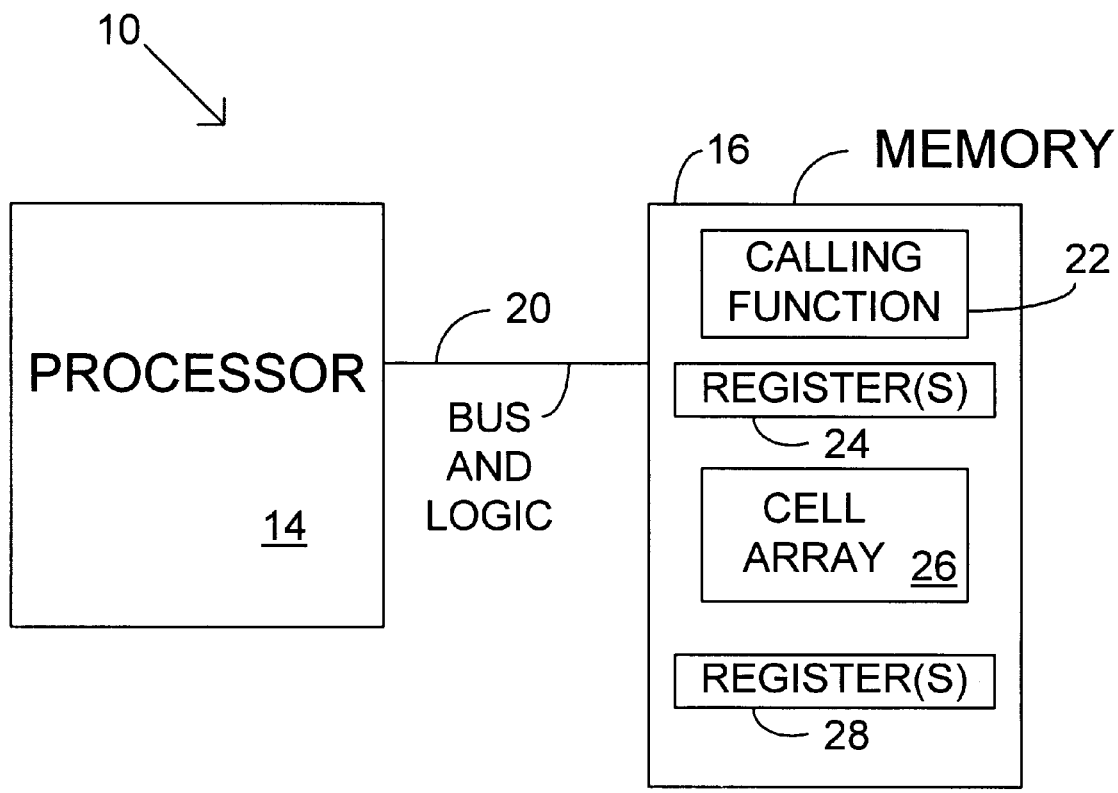
FIG. 1 is a block diagram representation of a computer system according to one embodiment of the present invention.

Referring to FIG. 1, a computer system 10 includes a processor 14 and memory 16. Memory 16 may be in random access memory (RAM), a hard drive, and/or other format. Processor 14 communicates with memory 16 through bus and related logic 20. Computer system 10 is not restricted to any particular type of computer system. For example, computer system 10 may be a system in which processor 14 is a Pentium® II processor manufactured by Intel Corporation. Details needed to implement memory, bus and related logic, and processors are well known and not discussed. Computer system 10 includes numerous other well known components which are not illustrated or described because doing so is not necessary to understanding the invention and may obfuscate the invention.

In the specification, the phrase "one embodiment" refers to one embodiment of the invention. It should be appreciated that the particular components or features referenced with respect to that one embodiment also may be present in other embodiments of the invention. Further, the various components or features mentioned are not required to be all present in the same embodiment of the invention. The various components or features may be mixed and matched in various embodiments.

Memory 16 includes register(s) 24 and cell array 26. At any particular time, code, data, and other binary values from cell array 26 may be distributed between on processor cache, off-processor cache (e.g., L2 cache), main memory, a hard drive, and/or other memory. The term "cell array" is intended to be interpreted broadly to include a binary structure that includes multiple cells, without restriction to particular form. For example, cell array 26 may be in contiguous memory locations within memory 16 or be distributed among non-contiguous memory locations.

Figure 2:
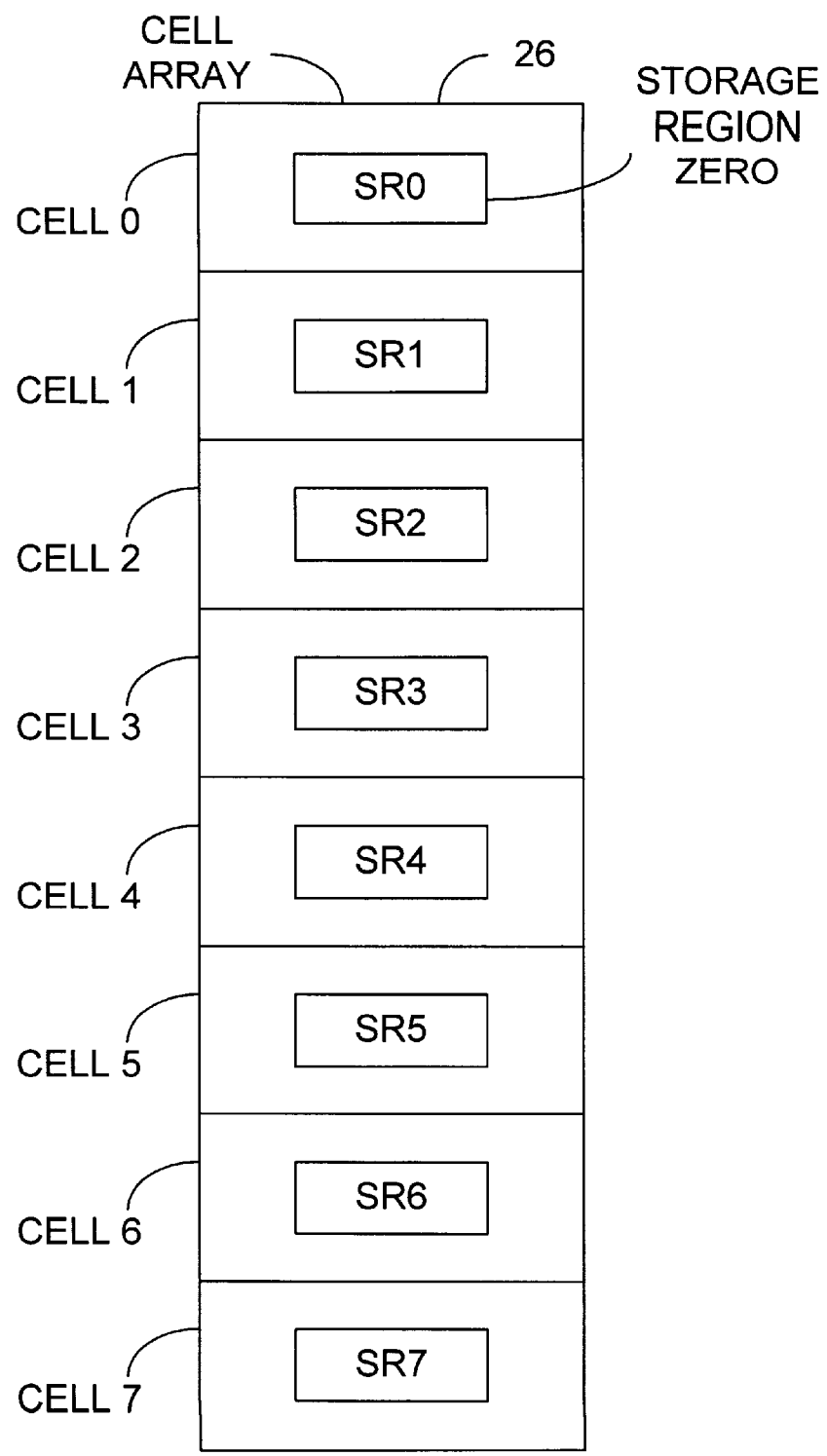
FIG. 2 is an illustration of a cell array used in one embodiment of the present invention.

Referring to FIG. 2, cell array 26 includes multiple cells. For ease of illustration and discussion, cell array 26 includes only eight cells: cells 0, 1, . . . , 7 (collectively cells 0–7). In practice, cell array 26 may include many more cells. Cell array 26 mutates or otherwise passes through various phases. Mutating through the various phases is an example of a mutation cycle or phase cycle.

In one embodiment, the mutations occur because processor 14 performs exclusive-OR (XOR) operations between the cells. In one embodiment, half the cells (e.g., cells 0–3)

are in a first portion of cell array 26, while the other half of the cells (e.g., cells 4–7) are in a second portion of cell array 26. In one embodiment, an XOR operation is performed on each of the cells of the first portion of cell array 26 with a partner from the cells of the second portion. In one embodiment, what is meant by one cell being XORed with another cell is that bits of the one cell are XORed with corresponding bits of the other cell. For example, bit 0 of cell 0 is XORed with bit 0 of cell 4; bit 1 of cell 0 is XORed with bit 1 of cell 4 and so forth so that bit n of cell 0 is XORed with bit n of cell 4. In other embodiments, a different order of bits (e.g., not incrementing or successive) may be used. In some embodiments, not all bits are XORed in every cell or phase. In the XOR function, 0 XOR 0=0, 0 XOR 1=1, 1 XOR 0=1, and 1 XOR 1=0. In this respect, code, data, and other binary are merely 1's and 0's and are susceptible to XOR operations.

At least one cell includes at least some plain text (or clear text) in each phase from which processor 14 (or other circuitry) may obtain instructions so that cell array 26 may at least mutate or otherwise pass to the next phase. Plain text is part of the original program (in phase 0) or compiler generated mutations thereof that may be executed. Other cells may contain what looks like executable code and, in fact, portions of the cells could be executable, but the cells are not executed. Indeed, the mutated binary bits that originated as code, data, or other binary may randomly have some meaning. This is desirable because it makes understanding cell array 26 all the more difficult to an attacker.

In FIG. 2, cells 0, 1, ..., 7 in cell array 26 include storage regions SR0, SR1, ... SR7, respectively. Some or all of the storage regions hold data from register(s) 24 of FIG. 1. The secret data from register(s) 24 is in mutated form in most or all but one of the phases. The act of mutating the data is a form of encryption and returning the data to a non-mutated form is a form of decryption.

The cell array is made tamper resistant by arranging the code and other binary such that if a bit is changed other than through XOR mutation or storage in a storage region SR0–SR7 at the appropriate phase, the contents of cell array 26 becomes corrupted. Depending on factors such as which bits are changed, in which phase and cell they are changed, and the number of cells and phases, cell array 26 could stop executing altogether or simply not give back the correct secret data. Depending on factors such as the code, the number of cells, the number of phases, and which bits are XORed and in which phase they are XORed, it is possible that there could be one or more bits other than the storage region that could be altered without preventing cell array 26 from giving back the correct secret data. However, with a large number of phases and well written code, the probability of that is very low. Further, if such bits existed, the number of them would be so small as to make them of little use to an attacker who presumably would not know their location.

The cells are not restricted to any particular size. However, they would be at least large enough to hold certain code and one of the storage regions. In one embodiment, all the cells are the same size and all the storage regions are the same size. The cells may also hold certain bits other than the code or data which are not executed. A purpose of these bits is to further obfuscate the contents and operation of the cells. The length of the code held in the cells will vary from depending on the implementation. For example, under one embodiment of the invention, cell array 26 is a part of a dynamic link library (DLL). When called by calling function 22, cell array 26 merely stores secret data to or retrieves secret data from register(s) 24 and goes through the various phases to encrypt or decrypt the data In other embodiments, the cell array may perform other functions.

Storage regions SR0–SR7 may be any of various sizes (e.g., one or two bytes each). Storage regions SR0–SR7 may be located at any particular location within the cells. For example, the storage regions may begin at the beginning of the cells or some distance into the cells. For example, the storage regions may begin 8, 32, or 64 bytes, or some other number of bytes (e.g. so as to be placed at the end of the cells) from the beginning of the cells.

In one embodiment, secret data from register(s) 24 is stored in and later retrieved from cell array 26 during a storage/retrieval phase. If the number of units (e.g., bytes) of the secret data is less than the number of storage locations, not every storage location will contain a secret data unit (e.g., a byte) or mutation thereof in every phase. Depending on the code, number of phases, and number of storage locations, there may be some storage locations that do not store secret data or a mutation thereof during any of the phases.

A calling function 22 stored in memory 16 calls cell array 26. In one embodiment, calling function 26 includes the following arguments not necessarily in order: (1) secret data, (2) an offset, (3) length, (4) store/retrieve, and (5) a phase identification number (PIN) (which may be mapped into designating the storage/retrieval phase). The secret data is the data in register(s) 24 to be stored in cell array 26. In one embodiment, the offset is the offset within a starting cell that designates the storage region location in which the PIN is to be held. Code in the starting cell may designate the storage region that holds a first portion (byte 0) of the secret data and so forth. The length is the length of the secret data and perhaps the PIN (e.g., the total bytes or words) to be stored or retrieved. Store/retrieve may be a single bit. For example, a logical 1 may designate a store causing secret data from register(s) 24 to be written into cell array 26 during phase 0, and a logical 0 may designate a retrieve causing secret data stored in cell array 26 to be written from cell array 26 into register(s) 24 or register(s) 28.

The PIN designates the storage/retrieval phase either directly or indirectly through mapping. In one embodiment, cell array 26 includes many possible storage/retrieval phases. The PIN may be, for example, 8 bits, which designates up to 256 items. Where the number of storage/retrieval phases is less than the possible PIN combinations, the PIN is mapped (e.g., through logical ANDing part of the bits with a number) into the storage/retrieval phase. The relationship between the PIN and the storage/retrieval phase may be scrambled through mapping to further obfuscate the operation of cell array 26. A user may select the PIN or it may be selected, e.g., randomly, for the user. As used herein, the term "random" without further explanation covers both true random numbers and pseudo-random numbers.

An illustrative example of the operation of cell array 26 is provided in the table of FIG. 3. It should be emphasized, however, that the example of FIG. 3 is merely intended to illustrate general information regarding the invention, and is not necessarily completely mathematically precise. A commercial implementation of the invention may include many more cells and many more phases so as to make it much more difficult for an attacker to discover either the specific secret data or perform a class attack on the mutation cycle. Cell array 26 may include different pairings. With these caveats, the following explanation of FIG. 3 is provided.

Cell array 26 has an initial state or initial phase, also called phase 0. When cell array 26 is not operating, phase 0 is a rest phase. While cell array 26 is in phase 0, only cell 0 is in plain text. That is, cell 0 includes code that is executed by processor 14. Cells 1–7 are not executed in phase 0, but could include what has the appearance of plain text. (The plain text in phase 0 could be in a cell other than cell 0.) In cell 0, there may be some bits (perhaps non-sense binary) in locations other than storage region SR0 that are not executed. It is desirable, but not required, that as much of cell array 26 as is possible has the appearance of plain text to obfuscate the operation of cell array 26.

Calling function 22 calls cell array 26 with a storage request to write secret data from register(s) 24 into cell array 26. Some or all of the arguments of calling function 22 may be stored in register(s) 24. These arguments may remain in memory 16 until they are needed or be placed into registers or a stack of processor 14 at the time of calling until they are needed. The PIN is, for example, "202." Through a mapping system, PIN "202" maps to phase number 3.

In response to the function call, code in cell 0 causes XOR pairings of certain cells listed in FIG. 3 which causes cell array 26 to mutate from phase 0 to phase 1. The storage regions SR0–SR7 of the cells are XORed with other ones of storage regions SR0–SR7 according to the pairings of the cells. For example, according to the listing of FIG. 3, cell 0 is XORed with cell 4. Therefore, SR0 is XORed with SR4 because SR0 is within cell 0 and SR4 is within cell 4. Under one embodiment, bit 0 of SR0 is XORed with bit 0 of SR4, bit 1 of SR0 is XORed with bit 1 of SR4 and so forth. (However, a different order of XORing bits could be used.) In one embodiment, storage regions are only XORed with other storage regions. At the end of the mutation, cell array 26 is in phase 1 and only cell 5 is in plain text.

Code in cell 5 causes XOR pairings of certain cells listed in FIG. 3 which causes cell array 26 to mutate from phase 1 to phase 2. At the end of the mutation, only cells 2 and 7 are in plain text meaning that either cell 2 or cell 7 could be executed depending on some condition or circumstance. There may be more than one cell in plain text for two reasons. First, having more than one cell in plain text could make it more difficult for an attacker because the attacker does not know which plain text is actually executed. Second, there may be a branch so that more than one cell is possible depending on some value.

Figure 4A:
FIG. 4A illustrates a register and contents thereof that is used in connection with one embodiment of the present invention.

Code in either cell 2 or 7 causes the mutation of cell array 26 from phase 2 to phase 3. At the end of the mutation, only cell 6 is in plain text. As noted, the PIN in combination with code in cell array 26 instructs processor 14 to write the secret data of register(s) 24 into particular ones of storage regions SR0–SR7. In the example, the offset is 36 bytes and the length is 4 bytes. Under one embodiment, the PIN is stored in storage regions along with the bytes of secret data, and the PIN is the first of the 4 bytes. Therefore, there are three remaining bytes of secret data. Referring to FIG. 4A, register (s) 24 could include the arguments for the calling function (although a different order of storage may be chosen). In FIG. 4A, the PIN is one byte, and bytes B0, B1, and B2 are 3 bytes of secret data.

Figure 4B:
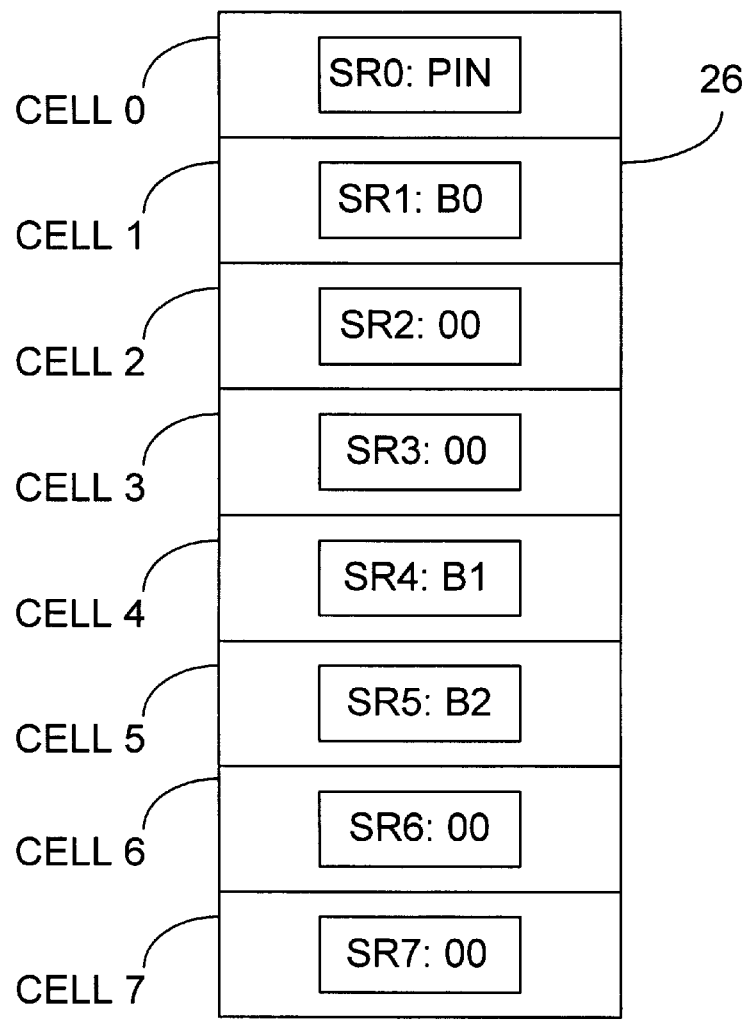
FIG. 4B is an illustration of the cell array of FIG. 2 and contents of storage regions therein during a particular phase of execution.

FIG. 4B illustrates the contents of cell array 26 in phase 3 after the calling function writes the PIN and secret data bytes B0, B1, and B2 into storage regions SR0, SR1, SR4, and SR5 of cell array 26. In one embodiment, part of the PIN and byte B0 are written into the first region of cell array 26 (i.e., cells 0–3) and bytes B1 and B2 are written into the second region of cell array 26 (i.e., cells 4–7) as is illustrated in FIG. 4B. Further, the cell pairings are such that the PIN and bytes of secret data are mutated during the first transition to the next phase, as in the example of FIGS. 3 and 4B.

In response to the XORs of the pairing listed in FIG. 3, cell array 26 mutates from phase 3 to phase 4. Likewise, cell array 26 mutates from phase 4 to phase 5 and from phase 5 back to phase 0, which is the rest phase. Likewise, the PIN and secret data bytes B1, B2, and B3 mutate from phase 3 to phase 4, and further from phase 4 to phase 5, and further yet from phase 5 to phase 0. Cell array 26 stays in its rest phase (phase 0) until it is called again. These mutations encrypt the PIN and secret data. (If the PIN and secret data may have already been in an encrypted form in register(s) 24, they are further encrypted by the mutations.)

Calling function 22 calls cell array 26 to retrieve the secret data. To decrypt the PIN and secret data, cell array 26 mutates from phase 0 to phase 1, from phase 1 to phase 2, and from phase 2 to phase 3. With each phase, the storage regions are mutated with other storage regions according to the pairing listed in FIG. 3. At phase 3, storage regions SR0, SR1, SR4 and SR5 contain the original PIN and secret data bytes B1, B2, and B3, respectively. Calling function 22 provides the PIN from register(s) 24 or else while cell array 26 is in phase 0 or a relatively low phase number. In one embodiment, the PIN is used by the code of cell array 26 beginning in cell 0 of phase 0. The PIN presented by calling function 22 is compared with the PIN in SR0 at phase 3. If there is a match, then the contents of SR1, SR4, and SR5 are written to an external register (e.g., register(s) 24 or register (s) 28). If there is not a match, cell array 26 does not allow the contents of SR1, SR4, and SR5 to be read. Further, in one embodiment, cell array 26 goes into a self-destruct mode because it is assumed that someone is attempted to misuse cell array 26. The self-destruct mode can include altering certain bits which cause the code and/or secret data to become corrupted and unexecutable. Cell array 26 could allow two chances to get the correct PIN before self-destroying. The self-destruction is a form of tamper resistance.

Rather than retrieving data, calling function 22 could call cell array 26 to write new secret data into cell array 26. During a store operation, in the storage regions, the bits which are not written over with the PIN and secret data may be left at whatever logical state they were in. Alternatively, for example, random numbers or all zeros or all ones may be written into these locations of the storage regions.

Different versions of cell array 26 may be created in which there are different possible phases in which the PIN can select from. The different versions may also include other differences including different numbers of phases and cells, different sizes of cells and storage regions, different order of passing arguments, and other features. A seller of the software under the invention may sell different versions to different customers. An original equipment manufacturer (OEM) may receive different versions and install different versions on different machines. Having different versions further increases the difficulty of discovering the operations of cell array 26.

Cell array 26 may be designed to include an anti-debug self-destruct feature which is activated if cell array 26 detects that certain flags in processor 14 have been set. For example, Pentium® processors of Intel Corporation have flags that are set if a debugger attempts to set break points or single step through a program. The code of cell array 26 may include features that put cell array 26 into self-destruct mode if it detects that certain bits are changed or it may merely destruct naturally through XOR operations with the wrong code. The tamper-resistant character of cell array 26 makes it resistant to debugging, tracing or static analysis.

One technique for determining the contents of cell array 26 at phase 0 is as follows. A matrix P contains all plain text cells used in any phase. Don't care sections such as storage regions may have random numbers or all 1s or all 0s. Matrix P is a N×1 matrix, where N is the number of cells of plain text. It may be useful to have N be a multiple of two. Extra cells of random numbers or all 0s or all 1s may be added to bring N to a multiple of two. A matrix M is a matrix of partnering that contains information about time (phase) and spatial (cell) placement. A matrix I is the initial phase (phase 0) of cell array 26. It is noted that P=M * I, where * signifies matrix multiply. Therefore, I=M$^{-1}$* P. M may be inverted through, for example, pivots and eliminations of the well known Gauss-Jordon technique.

Figure 5:
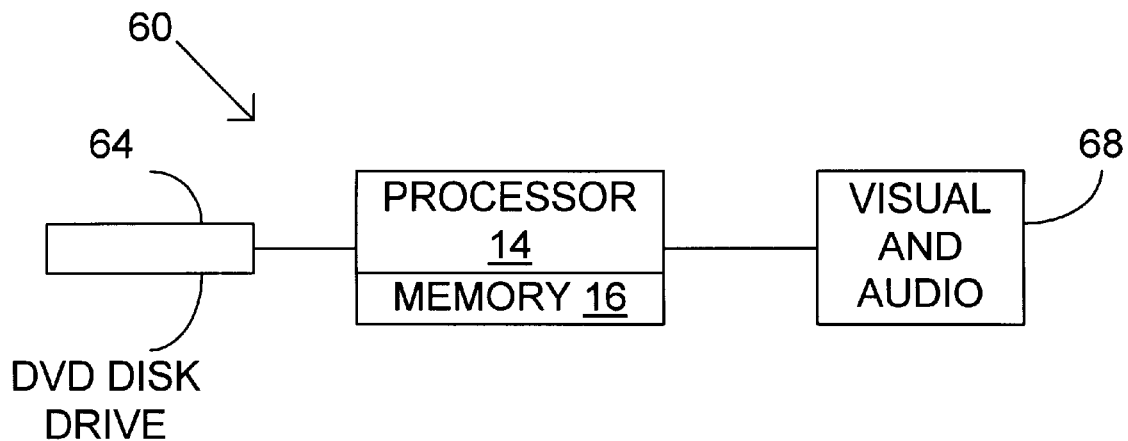
FIG. 5 is a block diagram representation of a DVD player employing a cell array according to the present invention.

Referring to FIG. 5, the present invention may be used in connection with a software based DVD player 60 including a disk drive 64 to temporarily store secret data (such as encryption key values) in connection with a processor 14 and memory 16 and visual and audio devices 68. The PIN may be randomly chosen with each store of secret data in cell array 26. Doing so makes it more difficult to discover the secret data involved in DVD decoding.

Figure 6:
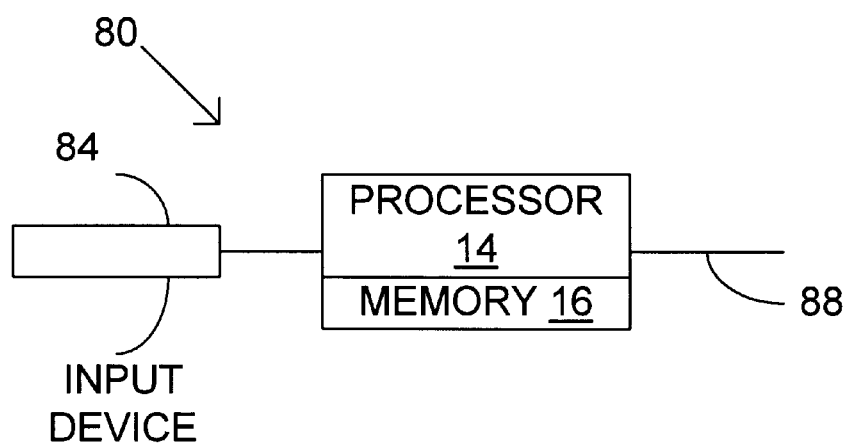
FIG. 6 is a block diagram representation of a computer system that uses a cell array according to the present invention to store secret data until it is needed.

Referring to FIG. 6, the present invention may be used in connection with an electronic commerce system 80 including an input device 84, such as a keyboard, and a processor 14 and memory 16 to stored passwords or other secret data on either or temporary, semi-permanent, or permanent basis. In some implementations, the contents of cell array 26 is lost once the owning process is terminated. In other implementations, cell array 26 is stored on disk. However, long term storage, particularly on disk, may make cell array 26 more available for attack. The password or other secret data may be made available on conductors 88. The same secret data may be retrieved multiple times from cell array 26. The PIN may be picked by the user or through some other means (e.g., randomly).

Figure 7A:
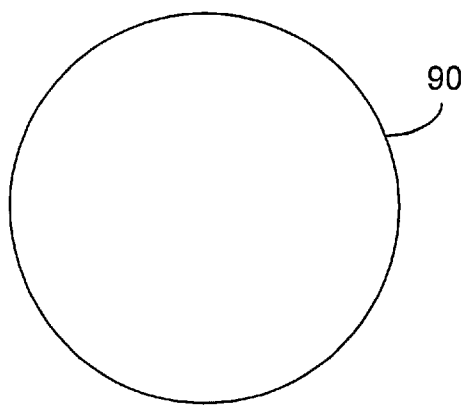
FIG. 7A is a top view of a disk, such as a CD ROM.
Figure 7B:
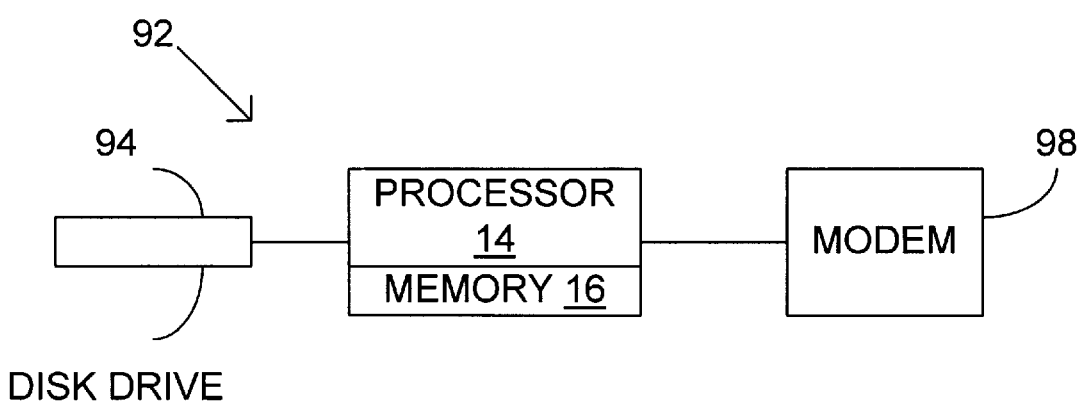
FIG. 7B is computer system used as a server or as a user of a cell array according to the present invention.

Referring to FIGS. 7A and 7B, cell array 26 or code that creates cell array 26, and/or calling function 22 may be stored in computer-readable form. For example, FIG. 7A illustrates a disk 90, which may be a compact disk read only memory (CD ROM), a DVD, a hard drive (as in a PC or a server), or other disk. A CD ROM or other disk may be mailed or carried to various vendors or end user purchasers. Different CD ROMs may contain different versions of cell array 26 or programs that create cell array 26.

Referring to FIG. 7B, a computer system 92 includes a disk drive 94, a processor 14, memory 16, and a modem 98. Computer system 92 may represent a system that transmits cell array 26, or code that creates cell array 26, from modem 98 to another computer. For example, computer system 92 could act as a server that provides the code through, for example, the World Wide Web or Internet E-mail. Cell array 26 or code that creates cell array 26 may reside in RAM in memory 16 from which it is provided to a remote location. Different versions of cell array 26 could be provided at different times. Alternatively, computer system 92 could represent a computer that plays disk 90 through disk drive 94 to store secret data in cell array 26. Computer system 92 may also represent a computer that executes a cell array or creates a cell array from code received over modem 98 from a remote source.

The present invention is not restricted to the above-described embodiments, but may be implemented in a variety of forms that will be apparent to those skilled in the art having the benefit of this disclosure. For example, in addition to the variations describe above, the following features may be included in various embodiments.

Although in an above-described embodiment, the code is self-contained within the cell array, in an alternative embodiment, there could be some code that is used in executing the cell array that remains unmutated and outside the cell array. Some of the cells could be of different sizes, some of the storage regions could be of different sizes, and not all the cells or all parts of the cells have to be XORed in each phase, however, doing these variations may increase the complexity of the code somewhat. It is not necessary that storage and retrieval of the secret data occur in the same phase. Further, secret data could be stored and retrieved over several phases. For example, in each of multiple phases, one byte of the secret data could be stored. Likewise, for example, in each of multiple phases, one byte of the secret data could be retrieved.

The results of XOR operations may be further obfuscated and encrypted by XORing, for example, 32-bit sections of the results with random cyclic constants.

The storage/retrieval phase is preferably several phases from phase 0 (on either end of the mutation cycle).

Although in the above illustrated embodiment, cells from a first portion (cells 0–3) of cell array 26 are only XORed with cells from a second portion (cells 4–7) of cell array 26, in different embodiments any cells could be XORed with any other of the cells.

An advantage of the present invention over other techniques is the speed at which secret data may be stored and retrieved. Another advantage is the tamper resistant nature of the cell array in which the secret data is encrypted and decrypted. The invention is lightweight in many embodiments because in many embodiments it takes a relatively small amount of memory.

Because of the nature of XOR operations, the total number of phases may be a multiple of 6. The number of cells in a commercial embodiment may be in the hundreds or thousands. Practically speaking, there is no reasonable limit to the number of bits in the secret data.

A middle point of the encryption/decryption mutation cycle does not necessarily occur at the rest phase (phase 0).

Use of a PIN, length, offset, and storage/retrieval in the calling function are not necessary. These parameters could be built into the cell array and/or be partially accomplished by using different calling functions. The calling function could include additional arguments not discussed herein. The storage process could be called by a different function that the retrieval process. The cell array does not have to be called by a function.

The term "responsive" and related terms mean that one signal or event is influenced to some extent by another signal or event, but not necessarily completely or directly.

The following claims including any amendments define the scope of the invention.

What is claimed is:

1. A method of storing and retrieving data, comprising:
   performing mutations of a cell array in a mutation cycle until a storage phase is reached;
   storing the data in storage regions of the cell array at the storage phase;
   mutating the cell array through additional phases in which the data stored in the cell array during the storage phase is encrypted by the mutations through the additional phases; and
   in response to a retrieval request, continuing the mutations until a retrieval phase is reached and the data is decrypted.

2. The method of claim 1, wherein the mutation cycle includes a rest phase wherein the data is encrypted.

3. The method of claim 1, wherein the storage phase and the retrieval phase are the same phase of the mutation cycle.

4. The method of claim 1, wherein the cell array is a tamper resistant binary structure.

5. The method of claim 1, wherein the mutating occurs through XOR operations of cells within the cell array.

6. The method of claim 1, wherein there is more than one possible storage phase and the method further comprises providing a phase identification number (PIN) to the cell array and wherein the cell array uses the PIN to determine the particular storage phase at which the data is stored.

7. The method of claim 6, wherein the PIN is stored in the cell array during the storage phase is a first PIN, and a second PIN is received as part of a retrieval request, and the first and second PINs are compared during a retrieval phase.

8. The method of claim 7, wherein if the first and second PINs match, the cell array allows the data to be retrieved.

9. The method of claim 7, wherein if the first and second PINs do not match, the cell array is not allowed to be retrieved.

10. The method of claim 7, wherein if the first and second PINs do not match, the cell array is not allowed to be retrieved and the cell array enters a self-destruct mode.

11. The method of claim 1, wherein there are additional storage phases and additional data that is stored in the additional storage phases.

12. A computer-readable medium having instructions thereon which wherein executed cause a computer system to perform acts comprising:

performing mutations of a cell array in a mutation cycle until a storage phase is reached;

storing data in a storage region of the cell array at the storage phase;

mutating the cell array through additional phases in which the data stored in the cell array during the storage phase is encrypted by the mutations through the additional phases; and in response to a retrieval request, continuing the mutations until a retrieval phase is reached and the data is decrypted.

13. The medium of claim 12, wherein the storage phase and the retrieval phase are the same phase of the mutation cycle.

14. The medium of claim 12, wherein there is more than one possible storage phase and the method further comprises providing a phase identification number (PIN) to the cell array and wherein the cell array uses the PIN to determine the particular storage phase at which the data is stored.

15. The medium of claim 12, wherein the PIN is stored in the cell array during the storage phase and is a first PIN, and a second PIN is received as part of a retrieval request, and the first and second PINs are compared during a retrieval phase.

16. The medium of claim 12, wherein the medium is a CD-ROM disk.

17. A system for storing and retrieving data, comprising:

memory containing a cell array having storage regions; and a processor that performs mutations of the cell array in a mutation cycle until a storage phase is reached, stores data in the storage regions of the cell array at the storage phase, and mutates the cell array to additional phases in which the data stored in the cell array during the storage phase is encrypted by the mutations through the additional phases.

18. The system of claim 17, further including a DVD player that includes the memory and processor.

19. The system of claim 17, further including a personal computer used for electronic commerce that includes the memory and processor.

20. A computer system, comprising:

a processor;

memory; and a computer readable medium having instructions that when executed cause the processor to:

create in the memory a matrix P of plain text calls to be used in a mutation cycle, the matrix P including don't care sections for use as storage regions;

receive data to be encrypted and decrypted in the don't care sections;

create in memory a matrix M of partnering that contains information about phase and cell placement;

invert matrix M to produce an inverted matrix $M^{-1}$; and create in memory the initial phase I of the cell array through a matrix multiply $I = M^{-1} * P$.

21. The system of claim 20, wherein the computer readable medium is a portion of the memory.

22. A method of creating an initial phase I of a cell array for encryption and decryption, comprising:

creating in memory a matrix P of plain text cells to be used in a mutation cycle, the matrix P including don't care sections for use as storage regions to store data to be encrypted and decrypted;

receiving data in the don't care sections;

creating in memory a matrix M of partnering that contains information about phase and cell placement;

inverting matrix M to produce an inverted matrix $M^{-1}$; and creating in memory the initial phase I of the cell array through a matrix multiply $I = M^{-1} * P$.

23. The method of claim 22, wherein at least a portion of the don't care sections have a same offset from beginnings of the plain text cells.

24. An article comprising:

a computer readable medium having instructions that when executed cause a computer system to:

create in memory a matrix P of plain text cells to be used in a mutation cycle, the matrix P including don't care sections for use as storage regions to store data to be encrypted and decrypted;

receive data in the don't care sections;

create in memory a matrix M of partnering that contains information about phase and cell placement;

invert matrix M to produce an inverted matrix $M^{-1}$; and create in memory the initial phase I of the cell array through a matrix multiply $I = M^{-1} * P$.

* * * * *

UNITED STATES PATENT AND TRADEMARK OFFICE
CERTIFICATE OF CORRECTION

PATENT NO. : 6,049,609 Page 1 of 1
DATED : April 11, 2000
INVENTOR(S) : Maliszewski It is certified that error appears in the above-identified patent and that said Letters Patent is hereby corrected as shown below:

<u>Title page,</u>
Item [57], ABSTRACT,
Line 7, delete "phase and is" and insert -- phase is --.

Signed and Sealed this

Twenty-third Day of July, 2002

*Attest:*

*Attesting Officer*

JAMES E. ROGAN
*Director of the United States Patent and Trademark Office*